United States Patent
Roy

(10) Patent No.: US 9,712,888 B2
(45) Date of Patent: Jul. 18, 2017

(54) SYSTEM AND METHOD FOR DYNAMICALLY OPTIMIZING QUALITY OF VIDEOS TRANSMITTED OVER COMMUNICATION NETWORKS

(71) Applicant: Wipro Limited, Bangalore (IN)

(72) Inventor: Rudrendu Roy, Hooghly (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/993,825

(22) Filed: Jan. 12, 2016

(65) Prior Publication Data
US 2017/0155969 A1 Jun. 1, 2017

(30) Foreign Application Priority Data
Nov. 27, 2015 (IN) .......................... 6390/CHE/2015

(51) Int. Cl.
| H04N 21/647 | (2011.01) |
| H04N 21/2343 | (2011.01) |
| H04N 21/25 | (2011.01) |
| H04N 21/234 | (2011.01) |
| H04N 21/2662 | (2011.01) |

(52) U.S. Cl.
CPC . *H04N 21/64738* (2013.01); *H04N 21/23418* (2013.01); *H04N 21/234381* (2013.01); *H04N 21/251* (2013.01); *H04N 21/2662* (2013.01)

(58) Field of Classification Search
CPC ..... H04N 21/64738; H04N 21/234381; H04N 21/251; H04N 21/23418; H04N 21/2662
See application file for complete search history.

(56) References Cited

U.S. PATENT DOCUMENTS

| 8,180,906 | B2* | 5/2012 | Attanasio | .......... H04M 3/42374 370/352 |
| 2005/0188407 | A1* | 8/2005 | van Beek | ........... H04N 21/2365 725/81 |
| 2006/0095942 | A1* | 5/2006 | van Beek | ........... H04N 21/2343 725/81 |
| 2006/0095943 | A1* | 5/2006 | Demircin | ........... H04N 21/2365 725/81 |
| 2006/0095944 | A1* | 5/2006 | Demircin | ............. H04N 19/172 725/81 |
| 2007/0153916 | A1* | 7/2007 | Demircin | ........... H04N 21/2365 375/240.26 |
| 2010/0235520 | A1* | 9/2010 | Attanasio | .......... H04M 3/42374 709/228 |

* cited by examiner

*Primary Examiner* — Hoang-Vu A Nguyen-Ba
(74) *Attorney, Agent, or Firm* — LeClairRyan, a professional Corporation

(57) ABSTRACT

This disclosure relates generally to communication networks, and more particularly to a system and method for dynamically optimizing a quality of a video being transmitted over a communication network. In one embodiment, the method comprises acquiring a plurality of video transmission parameters for the video being transmitted. The method further comprises deriving an optimum value for each of the plurality of video transmission parameters based on a predefined indicator of an acceptable quality of the video using meta-heuristic harmony search algorithm. The method further comprises dynamically optimizing the quality of the video based on the optimum value for each of the plurality of video transmission parameters.

15 Claims, 6 Drawing Sheets

SYSTEM AND METHOD FOR DYNAMICALLY OPTIMIZING QUALITY OF VIDEOS TRANSMITTED OVER COMMUNICATION NETWORKS

This application claims the benefit of Indian Patent Application Serial No. 6390/CHE/2015 filed Nov. 27, 2015, which is hereby incorporated by reference in its entirety.

FIELD

This disclosure relates generally to communication networks, and more particularly to a system and method for dynamically optimizing a quality of a video being transmitted over a communication network.

BACKGROUND

Mobile digital devices such as wireless devices, including, for example, cellular telephones, smart phones, laptop computers, notebook computers, and tablet devices have become ubiquitous in recent years. With evolving lifestyles, improved technologies, and ever changing socio-economic behavior, people are increasingly using these digital devices, from where ever they are, to communicate with one another over voice and message, to consume a wide variety of digital contents, and to perform day-to-day activities. These functions have become an integral part of our daily lives. For example, in today's world, mobile devices are increasingly used for real-time image and video transmission in addition to basic voice transmission. People remain connected with their nearest and dearest ones through the video calling/video chatting facility. Additionally, it is employed for several other multimedia services such as for streaming of multimedia contents.

In real-time video transmission, the quality of video plays a vital role. If quality degrades, it becomes very annoying in some scenarios like video chat, video conference, real-time streaming of a cricket match, and so forth. Technologists are continuously trying to find out new ways to increase speed and bandwidth of the mobile communication network to ensure uninterrupted and good quality streaming of multimedia contents such as video. The continuous evolution of mobile communication technologies for faster and better mobile broadband experiences resulted in 2G (speed up to 15 Kbps), 2.5G (speed up to 172 Kbps), 3G (speed up to 3.1 Mbps), 3.5G (speed up to 7.2 Mbps), and the latest LTE or 4G (up to 21 Mbps) communication technologies in rapid succession. However, it should be noted that spectrums or frequency band are an expensive recourse, which has to be utilized efficiently to support multiple services as well as multiple users. It is a great challenge to maximize the utilization of available bandwidth supporting multiple services, without sacrificing the quality of service. Further, even though the capacity and speed of the network are constantly increasing and its associated costs are declining, the amount of data travelling on the network is also still on the rise.

SUMMARY

In one embodiment, a method for optimizing dynamically optimizing a quality of a video being transmitted over a communication network is disclosed. In one example, the method comprises acquiring a plurality of video transmission parameters for the video being transmitted. The method further comprises deriving an optimum value for each of the plurality of video transmission parameters based on a predefined indicator of an acceptable quality of the video using meta-heuristic harmony search algorithm. The method further comprises dynamically optimizing the quality of the video based on the optimum value for each of the plurality of video transmission parameters.

In one embodiment, a system for dynamically optimizing a quality of a video being transmitted over a communication network is disclosed. In one example, the system comprises at least one processor and a memory communicatively coupled to the at least one processor. The memory stores processor-executable instructions, which, on execution, cause the processor to acquire a plurality of video transmission parameters for the video being transmitted. The processor-executable instructions, on execution, further cause the processor to derive an optimum value for each of the plurality of video transmission parameters based on a predefined indicator of an acceptable quality of the video using meta-heuristic harmony search algorithm. The processor-executable instructions, on execution, further cause the processor to dynamically optimize the quality of the video based on the optimum value for each of the plurality of video transmission parameters.

In one embodiment, a non-transitory computer-readable medium storing computer-executable instructions for dynamically optimizing a quality of a video being transmitted over a communication network is disclosed. In one example, the stored instructions, when executed by a processor, cause the processor to acquire a plurality of video transmission parameters for the video being transmitted. The stored instructions, when executed by a processor, further cause the processor to derive an optimum value for each of the plurality of video transmission parameters based on a predefined indicator of an acceptable quality of the video using meta-heuristic harmony search algorithm. The stored instructions, when executed by a processor, further cause the processor to dynamically optimize the quality of the video based on the optimum value for each of the plurality of video transmission parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
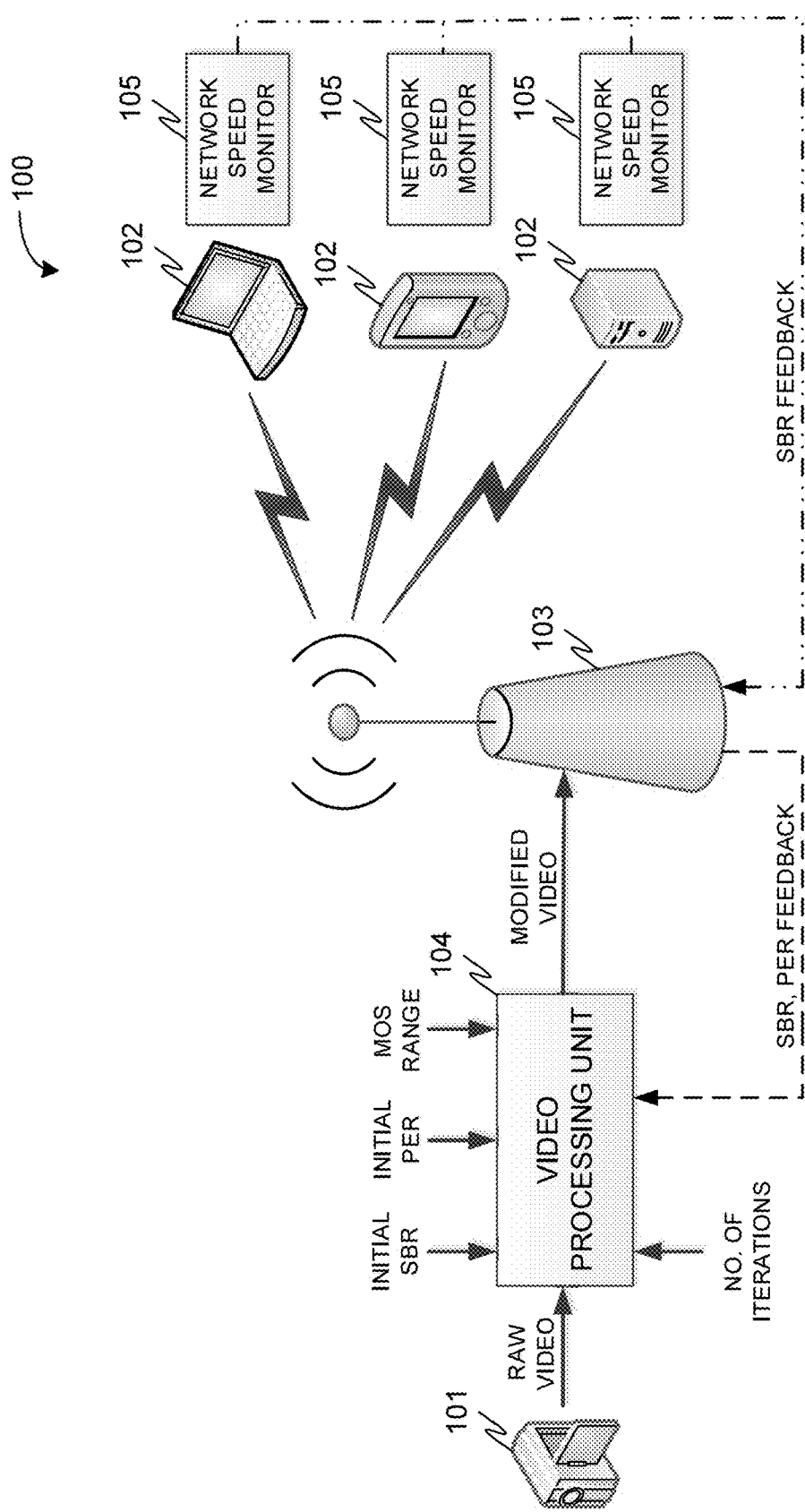
FIG. 1 is a block diagram of an exemplary broadcast system for dynamically optimizing a quality of a video being transmitted in accordance with some embodiments of the present disclosure.
Figure 2:
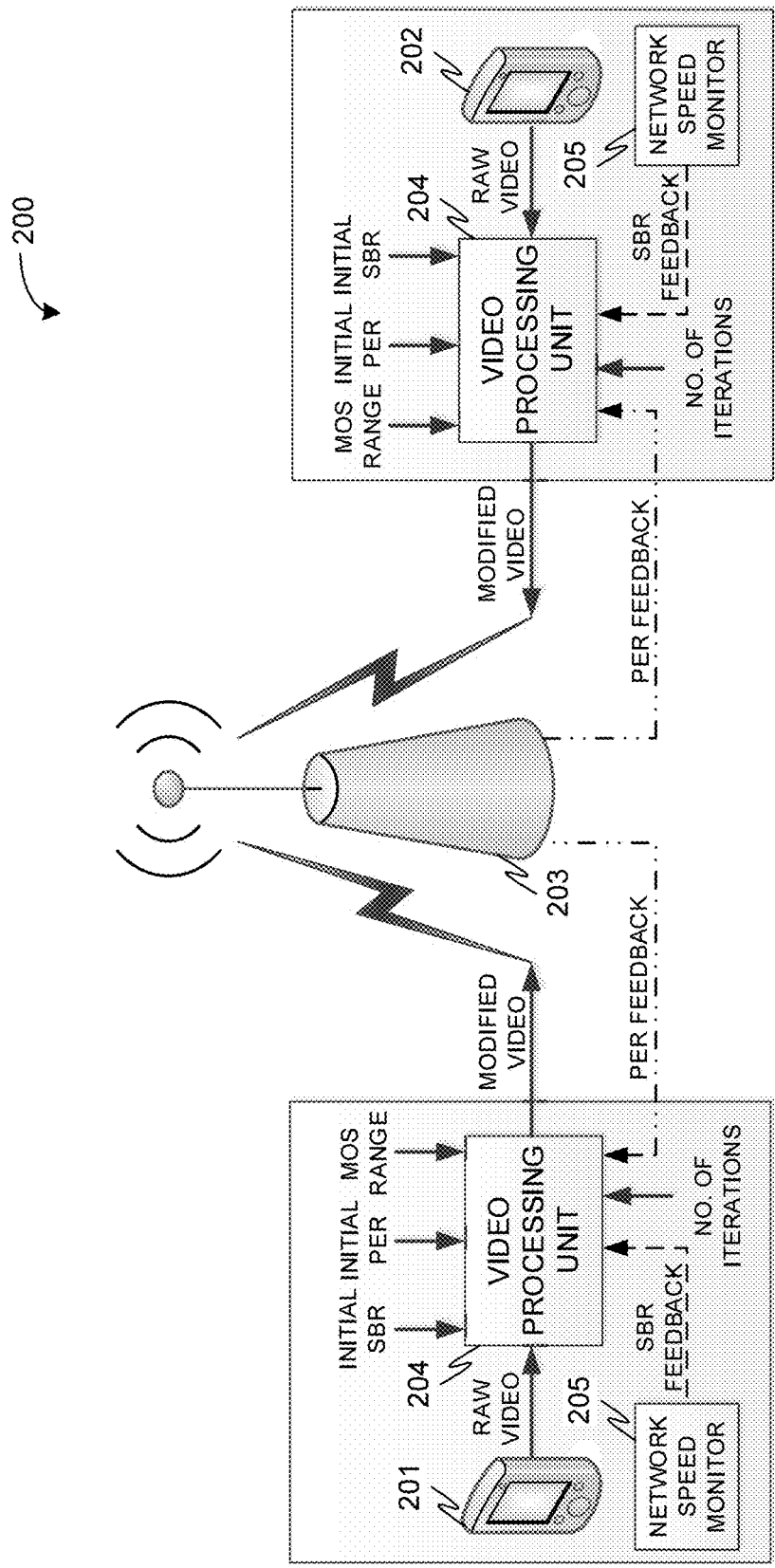
FIG. 2 is a block diagram of an exemplary unicast system for dynamically optimizing a quality of a video being transmitted in accordance with some embodiments of the present disclosure.

There are mainly two ways of transmitting multimedia streams such as video streams over the network from the source to the destination: broadcast and unicast. Broadcast is a one-to-all communication between the source and the destinations. In contrast, Unicast is a one-to-one communication between two devices. Each of the two devices becomes the source while transmitting and the destination while receiving the multimedia streams. Referring now to FIGS. 1 and 2, an exemplary broadcast system 100 and an exemplary unicast system 200 are illustrated in accordance with some embodiments of the present disclosure. In particular, the broadcast system 100 and the unicast system 200 are adapted to dynamically optimize a quality of a video being transmitted in real-time.

In the broadcast system 100, the multimedia streams are broadcasted from a source device 101 to multiple destination devices 102 over a communication device 103. In certain embodiments, the source device 101 may be a camera enabled device such as a video camera, a digital camera, a smartphone, a laptop, or a tablet for acquiring and transmitting raw video or any other device for transmitting raw video. Similarly, the destination device 102 may be a monitoring station or a recording server such as a personal computer, a laptop, a smartphone, or a tablet for receiving broadcasted video. In the unicast system 200, the multimedia streams are transmitted and received by each of the devices 201, 202 over a communication device 203. The devices 201, 202 may be a source device or a destination device depending on whether they are transmitting raw video or receiving transmitted video. In certain embodiments, the devices 201, 202 may be a video camera, a digital camera, a smartphone, a laptop, a tablet, a personal computer, or a server. The communication device 103, 203 may be a transceiver to facilitate various types of wireless transmission or reception technologies. In certain embodiments, the various types of wireless transmission or reception technologies may be 2G, 2.5G, 3G, 3.5G, or 4G communication technologies.

Additionally, in accordance with aspects of the present disclosure, the broadcast system 100 comprises a video processing unit 104 on the transmitter side for dynamically optimizing the quality of the video being transmitted in real-time. The video processing unit 104 receives the raw video from the source device 101, optimizes the video quality based on available bandwidth, and sends modified video to the communication device 103 for subsequent transmission through the network. The broadcast system 100 further comprises a network speed monitor 105 in each of the receiver module so as to constantly monitor the speed and provide the sender bit rate (SBR) feedback to the communication device 103. The communication device 103 provides the received SBR feedback along with the packet error rate (PER) feedback to the video processing unit 104. The video processing unit 104 uses the SBR and the PER feedback along with other inputs to modify the raw video. Further, in accordance with aspects of the present disclosure, the unicast system 200 comprises a video processing unit 204 and a network speed monitor 205 on each side (i.e., receiver side as well as the transmitter side) as the modified video may be transmitted from both the end.

As will be described in greater detail in conjunction with FIG. 3, the video processing unit 104, 204 optimizes the video quality during real time transmission over the communication network while efficiently utilizing the bandwidth of the communication network. As will be appreciated by those skilled in the art, frame rate (FR) and sender bit rate (SBR) of a video are the main parameters to describe a video quality. FR is defined as the number of frames or still image displayed over one second of time duration in a video playback, or in other words, the number of images photographed per second is referred to as the frame rate of the video and is measured in frames per second (fps). FR varies depending upon the speed of movement of the object in the motion picture. An increase in FR means that more movements are captured in a motion picture i.e. increase in received video quality. Reducing the frame rate tends to increase blurriness of a video, especially for fast action sequences. SBR is defined as the number of bits required to display in one second of video. A video with a bit rate of 320 kbps will have less compression and better quality than a video of bit rate 150 kbps. So, increase of SBR results in increase in video quality. An increase in FR triggers an increase in SBR. Thus, if FR as well as SBR increases, then the video quality increases. However, while transmitting through a communication network, packet error rate (PER) also needs to be accounted for. All the packet loss considered in the videos are typically assumed to be random losses distributed over a uniform probability density function which means that all the packets have the same probability to be dropped. Thus, if the PER increases, then the video quality at the receiver end decreases.

For optimizing video quality, an indicator or a measure of video quality should be identified. A mean opinion score (MOS) and a peak signal to noise ratio (PSNR) are two well-known parameters typically employed to define or to measure the video quality. The techniques described in the present disclosure employs MOS as a measure or an indicator of video quality. However, as will be appreciated by those skilled in the art, the described techniques are equally workable if any other parameter (e.g., PSNR) is employed as a measure or an indicator of video quality.

The MOS is employed by the described technique so as to ensure the quality of the video to be received at the receiver end before the transmission based on FR, SBR, and PER remains within an acceptable standard i.e., within an acceptable range of MOS. This acceptable range of MOS may be predefined by the network operator, or the user receiving the video, or the user transmitting the video, or a third party enabling the video transmission. The MOS range lies between 1 (low quality) to 5 (high quality) to rate the quality of a video. In some embodiments, the acceptable MOS range is between 3 and 5. Further, in some embodiments, the acceptable MOS range is between 3.5 and 4.5. MOS is determined by classifying the video into different video groups (e.g., slight movement, gentle walking, rapid movement, and so forth) based on spatial and temporal features of the video and is given as:

$$MOS=(a\_1+a\_2\ FR+a\_3\ \ln(SBR))/(1+a\_4\ PER+ a\_5\ [(PER)]^2)$$

where SBR is the sender bite rate, FR is the frame rate, and PER is the packet error rate as noted above, and where a1, a2, a3, a4, and a5 are MOS coefficients indicating the goodness of fit of the video with respect to the different video groups. As shown in the above equation, MOS is a function of FR, SBR, and PER. Thus, an increase in FR increases SBR, thereby increasing the MOS.

The video processing unit 104, 204 employs a meta-heuristic harmony search algorithm to optimize the video quality i.e. an optimized MOS along with optimized SBR, FR and PER. The harmony search is a search technique to find out the maxima or minima in a given range of values of an nth order equation. Thus, an optimum value of bitrate and frame rate of a video to achieve the best quality may be determined by adjusting different parameters. The video processing unit 104 and 204 comprises one or more processors and a computer-readable medium (e.g., a memory). The computer-readable medium stores instructions that, when executed by the one or more processors, cause the one or more processors to perform dynamic optimization of the video quality during real time transmission in accordance with aspects of the present disclosure. The video processing unit 104, 204 may reside within the transmitting device, or may reside within the communication device, or may reside independently on a separate remote device communicatively coupled to the communication device.

Figure 3:
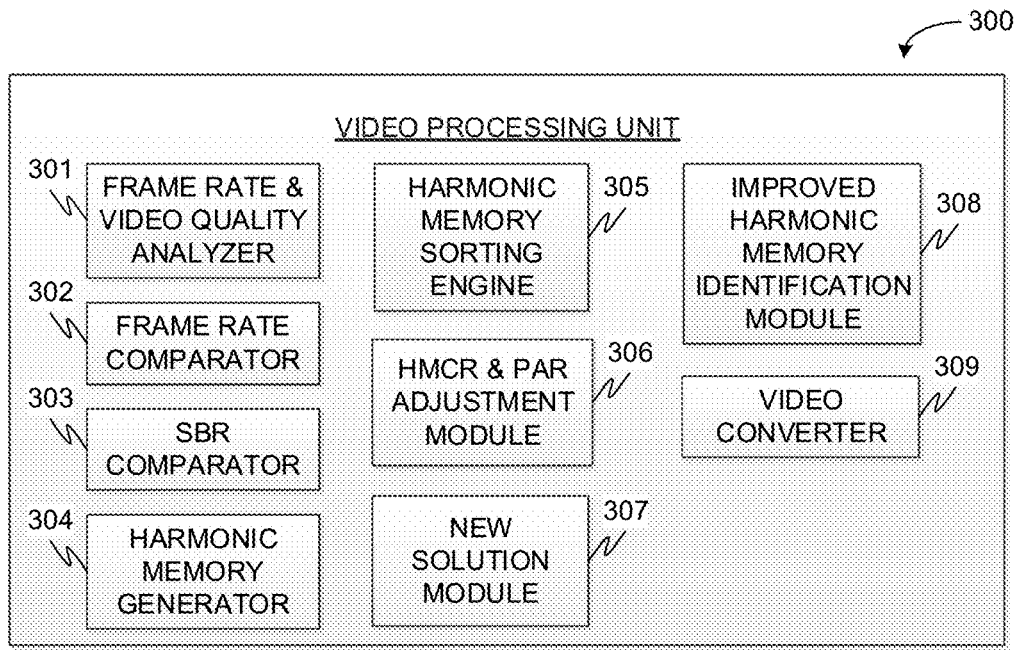
FIG. 3 is a functional block diagram of a video processing unit in accordance with some embodiments of the present disclosure.

Referring now to FIG. 3, a functional block diagram of a video processing unit 300, analogous to the video processing unit 104 implemented by the broadcast network 100 of FIG. 1 or the video processing unit 204 implemented by the unicast network 200 of FIG. 2, is illustrated in accordance with some embodiments of the present disclosure. As will be described in greater detail below, the video processing unit 300 acquires a plurality of video transmission parameters for the video being transmitted, derives an optimum value for each of the plurality of video transmission parameters based on a predefined indicator of an acceptable quality of the video using meta-heuristic harmony search algorithm, and dynamically optimizes the quality of the video based on the optimum value for each of the plurality of video transmission parameters. The video processing unit 300 includes various logical units to optimize the video quality. In some embodiments, the video processing unit 300 comprises a frame rate (FR) and video quality analyzer 301, a frame rate (FR) comparator 302, a sender bitrate (SBR) comparator 303, a harmonic memory (HM) generator 304, a harmonic memory (HM) sorting engine 305, a HMCR and PAR adjustment module 306, a new solution module 307, an improved harmonic memory (HM) identification module 308, and a video converter 309.

The FR and video quality analyzer 301 receives raw video and extracts the FR of the raw video (i.e., initial video FR) along with indicator of quality of the raw video. In some embodiments, where MOS is employed as the measure or the indicator of video quality, FR and video quality analyzer 301 extracts MOS coefficients (i.e., a1, a2, a3, a4, and a5) from the raw video. The FR comparator 302 takes initial FR as one of the inputs form FR and video quality analyzer 301and takes optimized FR as the other input which is feedback from the optimized output. The FR comparator 302 then compares both the inputs and directs the greater value in the FRMax probe and lesser one in the FRMin probe. As the system continues to run the difference between these two inputs iteratively decreases and as a result the difference of FRMax and FRMin (i.e. the range of FR in Harmonic Memory) also iteratively decreases. This leads to the selection of the best or optimized FR in a range of possible FRs. Similarly, the SBR comparator 303 takes initial SBR as one of the inputs from the network speed monitor and takes optimized SBR as the other input which is feedback from the optimized output. The SBR comparator 303 then compares both the inputs and directs the greater value in the SBRMax probe and lesser one in the SBRMin probe. Again, as the system continues to run the difference between these two inputs iteratively decreases and as a result the difference of SBRMax and SBRMin (i.e. the range of SBR in Harmonic Memory) also decreases. This leads to the selection of the best or optimized SBR in a range of possible SBRs.

Additionally, an acceptable range of MOS (i.e., MOSMax, and MOSMin) is provided to the video processing unit 300 for video quality optimization. As noted above, the acceptable range of MOS may be predefined by the network operator, or the user receiving the video, or the user transmitting the video, or a third party enabling the video transmission. Similarly, a range of PER (i.e., PERMax and PERMin) is provided to the video processing unit 300. The range of PER may be initially provided by the network operator and is subsequently updated based on feedback from the network. Further, a maximum iteration count may be provided to the video processing unit 300 for video quality optimization. Finally, SBRMax, SBRMin, FRMax, FRMin, PERMax, PERMin, MOSMax, MOSMin, and maximum iteration count proceeds through optimizer for optimization.

The HM generator 304 generates a harmonic memory (HM) based on plurality of above discussed video transmission parameters. In some embodiments, the HM is introduced as a [5× HMS] matrix, where HMS denotes HM Size. The count of 5 comes with the 4 video transmission parameters (i.e., FR, SBR, PER, MOS) and a fitness function f(x) value. The fitness function to be optimized is a function of the 4 video transmission parameters and is given as:

$$f(x)=f(MOS,\ SBR,\ FR,\ PER)$$

In particular, the fitness function f(x) is given as:

$$f(x)=|MOS-(a\_1+a\_2\ FR+a\_3\ \ln(SBR))/(1+a\_4\ PER+a\_5\ [(PER)]^2$$

By minimizing this fitness function through harmony search algorithm, an optimum value for SBR and FR is determined so that user experiences the best video quality while at same time channel bandwidth is optimally utilized. As noted above, an increase in SBR and FR will increase the video quality i.e. MOS. However, it is desirable to determine best combination of SBR and FR so that the video quality is not compromised while at same time there is efficient utilization of channel bandwidth. Initially a random adjustment is made within the MAX and MIN values of these video transmission parameters using a uniform random number. These values then pass through a logical sub-unit, a fitness function calculator to get the f(x). Thus, the complete initial HM obtained.

The initial HM then passes through a sorting process in the HM sorting engine 305 that sorts the HM from best to worst value based on fitness function f(x) value. The best value implies smallest f(x) and worst value implies largest f(x). After the sorted HM is ready, it passes through a HMCR and PAR adjustment module 306 that adjusts the sorted HM by at least one of a harmony memory consideration rate (HMCR) and a pitch adjustment rate (PAR). The HMCR is the probability of choosing one value from the historic values stored in the HM, and (1-HMCR) is the probability of randomly choosing one feasible value not limited to those stored in the HM. For example, an HMCR of 0.95 indicates that the HS algorithm will choose the design variable value from historically stored values in the HM with a 95% probability and from the entire feasible range with a 5% probability. Further, every value in the HM is examined to determine whether it should be pitch-adjusted. The pitch adjusting process is performed only after a value is chosen from the HM. By way of example, a PAR of 0.3 indicates that the algorithm will choose a neighboring value with 30%*HMCR probability. A random solution is picked either with a probability of HMCR and the value slightly changed with PAR probability within or with a probability of (1-HMCR) outside of HM but within the value range of the parameters. The new solution module 307 finds the new solution based on the adjusted parameters from HMCR and PAR module 306. As will be appreciated, the new solution is the random solution that is picked for at least one of the HMCR and PAR adjustment.

The improved HM identification module 308 passes the new solution through two decision block to check if the new solution is an improved one or not. If the new solution is smaller than the best solution, then the module 308 updates HM by replacing the best (i.e., the first) solution with the new one. In contrast, if the new solution is greater than the worst solution, then the module 308 discards the new solution and does not update HM. However, if the new solution lies between the best and worst solution then the module 308 finds the index i for which $$fi-1(x) \leq fnew(x) \leq fi(x)$$

and then updates HM by replacing the ith solution with the new one. In some embodiments, the complete process of identifying new solution and improving the solution continues till the maximum iteration count and the best solution is produced as optimized FR, SBR, and MOS. It should be noted that as the number of iteration increases, optimum values of FR and SBR and minimum fitness value are derived. Alternatively, the process iterates till the completion of the video transmission.

As will be appreciated by those skilled in the art, the best or the first solution from the sorted or the updated HM is the one with optimized FR, SBR, and MOS. As noted above, the optimized FR and SBR are the feedback input to the respective comparators 302 and 303. Finally, the video converter 309 takes raw video and optimized parameters as input, modifies the raw video based on the optimized parameters, and sends the modified video as output for subsequent transmission. In some embodiments, the video convertor 309 may be a frame rate convertor that modifies the raw video based on the optimized frame rate.

It should be noted that the video processing unit 300 may be implemented in programmable hardware devices such as programmable gate arrays, programmable array logic, programmable logic devices, and so forth. Alternatively, the video processing unit 300 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for dynamically optimizing a quality of a video being transmitted over a communication network. For example, the exemplary system 100, 200 and the associated video processing unit 104, 204, 300 may dynamically optimize of the video being transmitted in real-time by the processes discussed herein. In particular, as will be appreciated by those of ordinary skill in the art, control logic and/or automated routines for performing the techniques and steps described herein may be implemented by the system 100, 200 and the associated video processing unit 104, 204, 300, either by hardware, software, or combinations of hardware and software. For example, suitable code may be accessed and executed by the one or more processors on the video processing unit 104, 204, 300 to perform some or all of the techniques described herein. Similarly, application specific integrated circuits (ASICs) configured to perform some or all of the processes described herein may be included in the one or more processors on the video processing unit 104, 204, 300.

Figure 4:
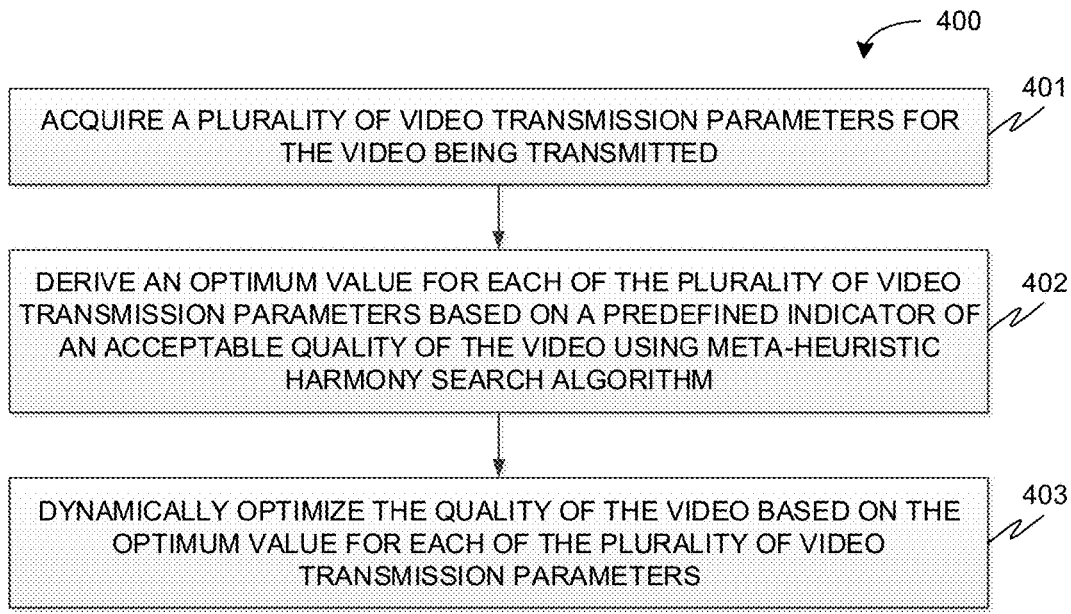
FIG. 4 is a flow diagram of an exemplary process for dynamically optimizing a quality of a video being transmitted over a communication network in accordance with some embodiments of the present disclosure.

For example, referring now to FIG. 4, exemplary control logic 400 for dynamically optimizing a quality of a video being transmitted over a communication network via a system, such as system 100 or 200, is depicted via a flowchart in accordance with some embodiments of the present disclosure. As illustrated in the flowchart, the control logic 400 includes the steps of acquiring a plurality of video transmission parameters for the video being transmitted at step 401, and deriving an optimum value for each of the plurality of video transmission parameters based on a predefined indicator of an acceptable quality of the video using meta-heuristic harmony search algorithm at step 402. The control logic 400 further includes the step of dynamically optimizing the quality of the video based on the optimum value for each of the plurality of video transmission parameters at step 403.

As noted above, in some embodiments, the plurality of video transmission parameters comprises at least one of a frame rate (FR), a sender bit rate (SBR), and a packet error rate (PER) for the video being transmitted. In some embodiments, deriving the optimum value for each of the plurality of video transmission parameters at step 402 comprises determining a maximum frame rate, a maximum sender bit rate, and a minimum packet error rate for the predefined indicator of the acceptable quality of the video.

Additionally, as noted above, in some embodiments, the predefined indicator of the acceptable quality of the video comprises a predefined mean opinion score (MOS). In some embodiments, deriving the optimum value for each of the plurality of video transmission parameters at step 402 comprises the steps of acquiring a plurality of MOS coefficients for the video, determining a MOS of the video based on the plurality of MOS coefficients and the plurality of video transmission parameters, determining a fitness function based on the MOS of the video and the predefined MOS, and deriving the optimum value for each of the plurality of video transmission parameters based on the fitness function. Further, in some embodiments, the control logic 300 includes the step of determining a minimum value, a maximum value, and a plurality of random values between the minimum value and the maximum value for each of the plurality of video transmission parameters and for the predefined MOS.

In some embodiments, the control logic 300 further includes the steps of generating a harmonic memory matrix, and sorting the harmonic memory matrix based on the fitness function. It should be noted that the harmonic memory matrix comprises the minimum, the plurality of random, and the maximum values for each of the plurality of video transmission parameters; the minimum, the plurality of random, and the maximum value for the predefined MOS; and a plurality of values for the fitness function determined based on the minimum, the plurality of random, and the maximum values for each of the plurality of video transmission parameters and for the predefined MOS. Additionally, it should be noted that the optimum value for each of the plurality of video transmission parameters corresponds to the fitness function having the minimum value.

Moreover, in some embodiments, the control logic 300 includes the steps of adjusting the harmonic memory matrix by at least one of a harmony memory consideration rate (HMCR) and a pitch adjustment rate (PAR), identifying a new fitness function from the adjusted harmonic memory matrix, discarding the new fitness function or updating the harmonic memory matrix based on a comparison of the new fitness function with the minimum and the maximum fitness function, and iterating the adjusting, the identifying, the discarding or the updating steps at a predefined periodic interval for a predefined number of times or till the completion of the video transmission. Further, in some embodiments, dynamically optimizing the quality of the video at step 403 comprises the step of modifying the video based on at least one of an optimum frame rate and an optimum sender bit rate.

Figure 5A:
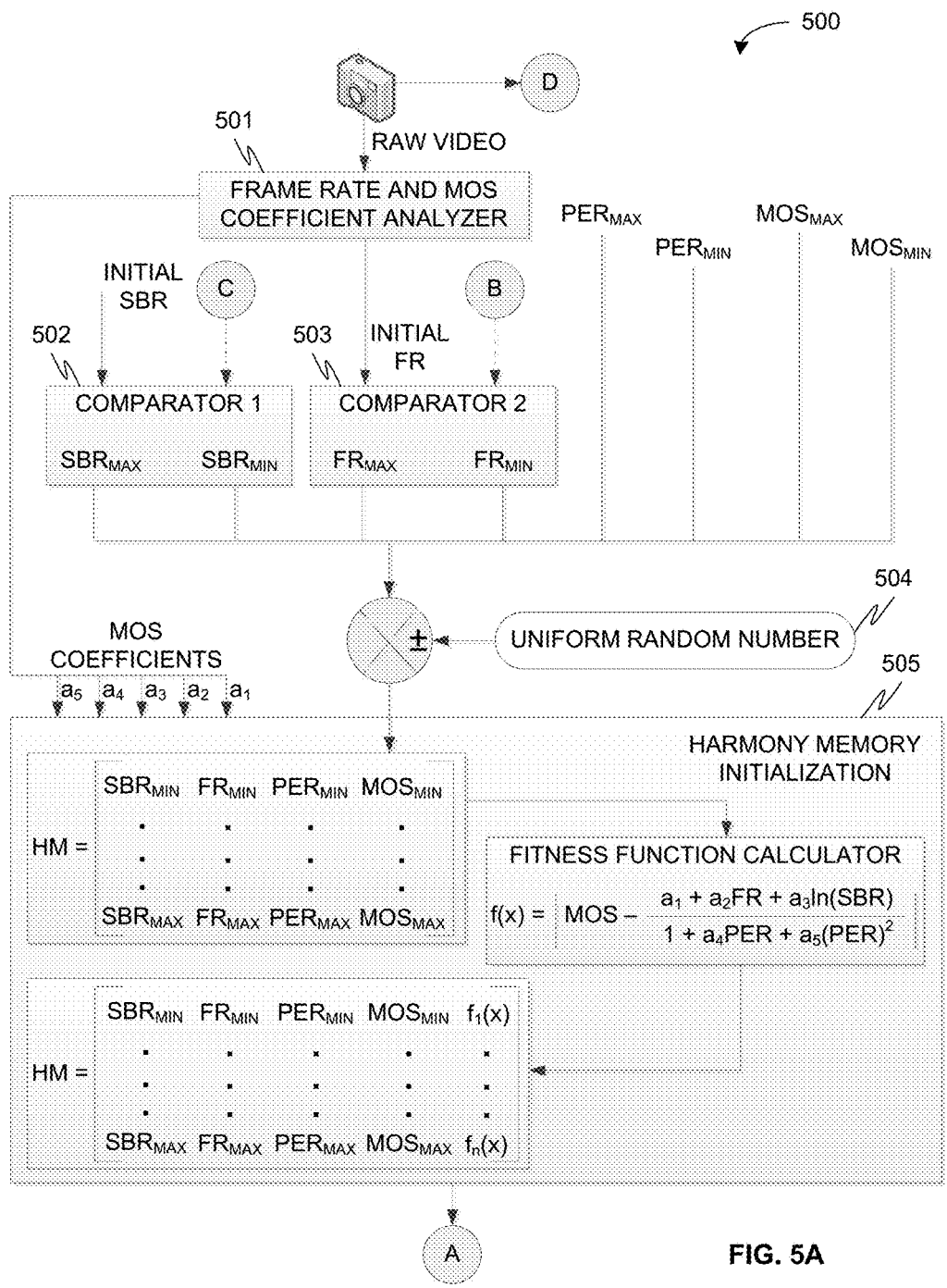
FIGS. 5A and 5B is a flow diagram of a detailed exemplary process for dynamically optimizing a quality of a video being transmitted in accordance with some embodiments of the present disclosure.
Figure 5B:
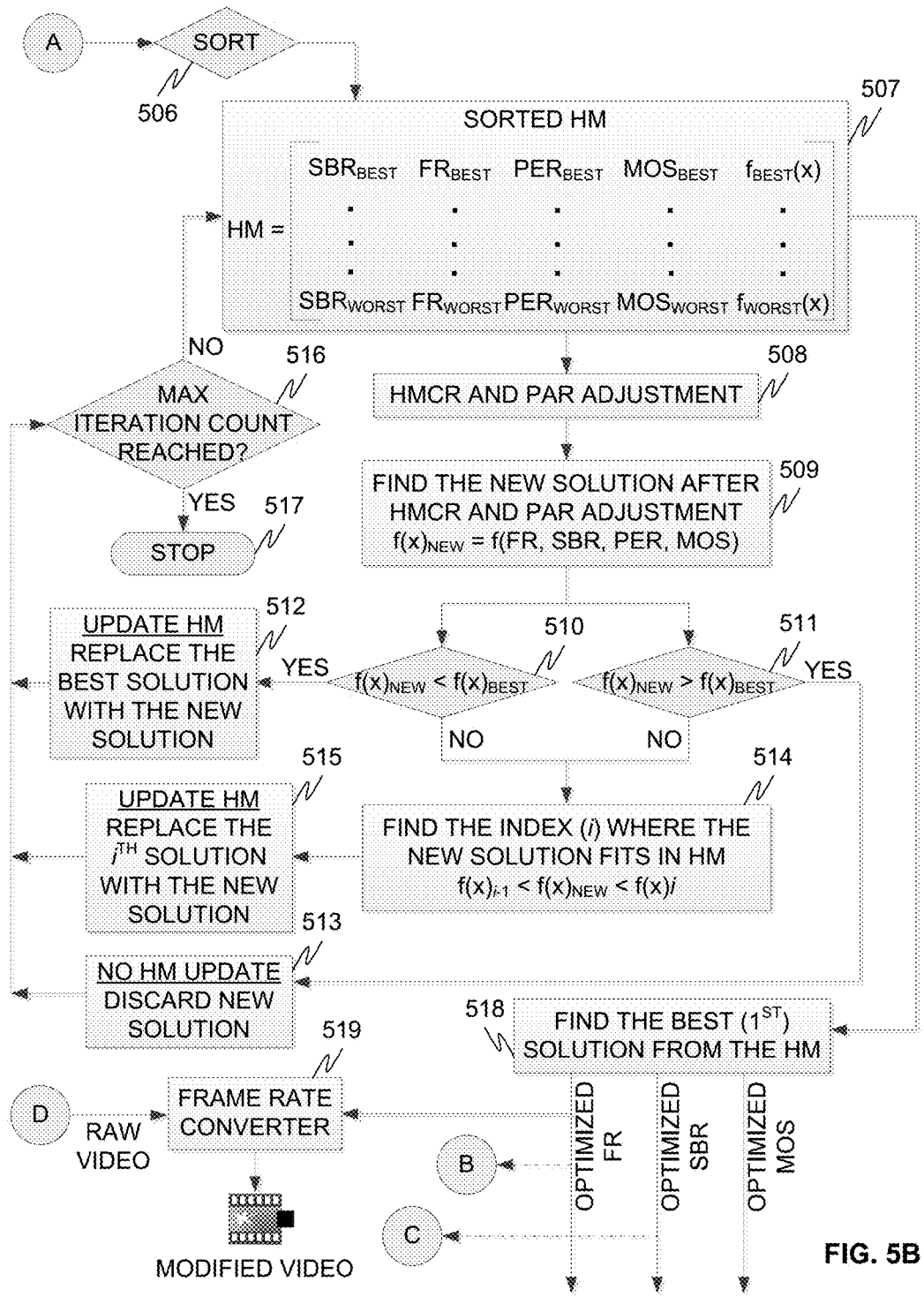

Referring now to FIGS. 5A and 5B, exemplary control logic 500 for dynamically optimizing the quality of the video being transmitted over a communication network is depicted in greater detail via a flowchart in accordance with some embodiments of the present disclosure. As illustrated in the flowchart, the control logic 500 includes the step of receiving the raw video and extracting initial FR and MOS coefficients from the raw video via the FR and video quality analyzer at step 501. The control logic 500 further includes the step of receiving the initial FR extracted above and optimized FR as feedback from the output and comparing them to determine FRMax and FRMin via the FR comparator at step 502. Similarly, the control logic 500 include the step of receiving the initial SBR from the network speed monitor and optimized SBR as feedback from the output and comparing them to determine SBRMax and SBRMin via the SBR comparator at step 503. Additionally, the control logic 500 includes the step of receiving the MOSMax and MOSMin as well as PERMax and PERMin from the network operator. In some embodiments, the control logic 500 include the step of receiving a maximum iteration count. The control logic 500 further includes the step of making a random adjustment within the MAX and MIN values of the video transmission parameters (e.g., FR, SBR, PER, and MOS) using a uniform random number at step 504.

Additionally, the control logic 500 includes the step of generating an initial HM matrix based on the plurality of video transmission parameters and MOS coefficients via the HM generator and the fitness function calculator at step 505. The control logic 500 further includes the steps of sorting the initial HM based on fitness function f(x) value to generate a sorted HM via the HM sorting engine at step 506, and adjusting the sorted HM 507 by at least one of a harmony memory consideration rate (HMCR) and a pitch adjustment rate (PAR) via the HMCR and PAR adjustment module at step 508. Further, the control logic 500 includes the step of finding the new solution based on the adjusted parameters at step 509. The control logic 500 includes the step of checking if the new solution is an improved one or not via the improved HM identification module at step 510 and 511. If the new solution is smaller than the best solution at step 510, then the control logic 500 includes the step of updating HM by replacing the best (i.e., the first) solution with the new one at step 512. In contrast, if the new solution is greater than the worst solution at step 511, then the control logic 500 includes the step of discarding the new solution and not updating HM at step 513. However, if the new solution lies between the best and worst solution at step 510 and 511, then the control logic 500 includes the step of finding an index i where the new solution fits in HM at step 514 and updating the HM by replacing the ith solution with the new one at step 515. The control logic 500 further includes the step of determining if the maximum iteration count has reached at step 516 and if so then stopping the process at step 517. If the maximum iteration count has not reached then the process of identifying new solution and improving the solution continues till the maximum iteration count.

Moreover, the control logic 500 includes the step of finding the best solution from the sorted HM and determining optimized FR, SBR, and MOS from the best solution at step 518. The optimized FR and SBR are then provided as feedback input to the respective comparators at step 502 and 503. Additionally, the control logic 500 includes the step of modifying the raw video based on the optimized parameters via the video convertor at step 519 and producing the modified video as output for subsequent transmission.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the technology. When implemented on a general-purpose microprocessor, the computer program code segments configure the microprocessor to create specific logic circuits.

Figure 6:
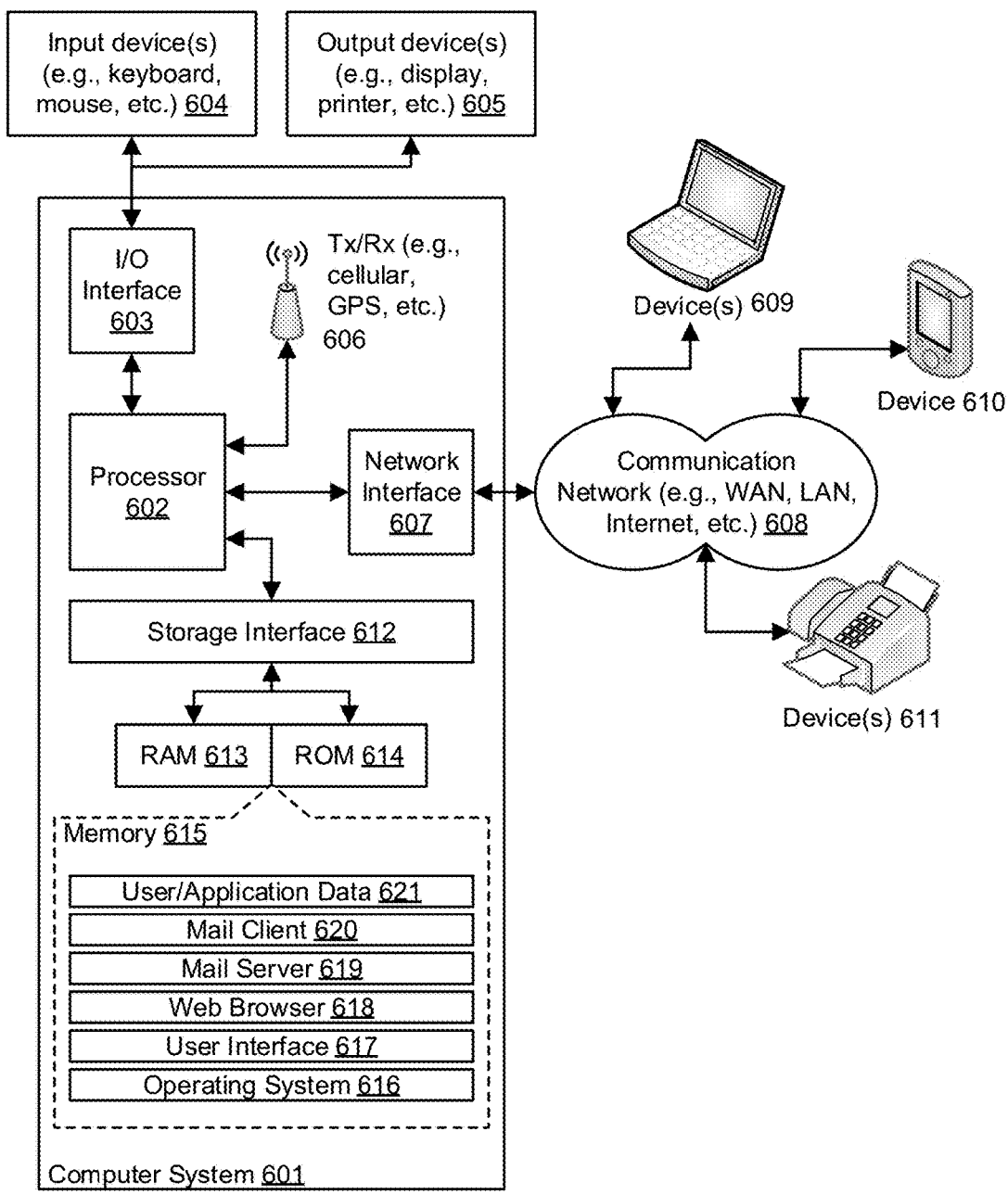
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100, 200 and video processing unit 104, 204, 300 for dynamically optimizing quality of the video being transmitted over a communication network in real-time. Computer system 601 may comprise a central processing unit ("CPU" or "processor") 602. Processor 602 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 60 1. Examples of operating systems include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUis) may be employed, including, without limitation, Apple® Macintosh® operating systems' AQUA® platform, IBM® OS/2® platform, MICROSOFT® WINDOWS® platform e.g.,AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, the computer system 601 may implement a web browser 618 stored program component. The web browser may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, the computer system 601 may implement a mail server 619 stored program component.

The mail server may be an Internet mail server such as MICROSOFT® EXCHANGE® mail server, or the like. The mail server may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. The mail server may utilize communication protocols such as interne message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 601 may store user/application data 621, such as the data, variables, records, etc. (e.g., FR SBR, MOS, PER, MOS coefficients, HM, sorted HM, maximum iteration count, fitness function, optimized FR, optimized SBR, optimized MOS, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above results in improvement in real-time video transmission quality and optimization of the channel bandwidth. In other words, the techniques provides for optimizing video quality for efficient utilization of channel bandwidth. The techniques employ a meta-heuristic harmony search algorithm to find the best choice of frame rate and transmission bit rate to optimize the MOS of real-time video transmission. For example, in some scenarios, the technique may provide that if a video is transmitted with 26 fps at a 1046 kbps, the user may be able to experience a good video quality (i.e., MOS>4). This results in a significant saving of transmission bandwidth which may be utilized for providing other multimedia services. Thus, the techniques enable transmission of real-time video with the best possible quality in an optimized network bandwidth.

Further, as will be appreciated by those skilled in the art, the techniques described in the various embodiments discussed above may be equally workable for other multimedia streams such as high definition audio, streaming text, streaming image, or a combination thereof. Similarly, MOS or any other suitable parameter may be employed as a measure or an indicator of quality of such multimedia streams.

The specification has described system and method for dynamically optimizing quality of a video being transmitted in real-time. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description.

Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for dynamically optimizing quality of videos transmitted over communication networks, the method comprising:
   acquiring, by a video processing device, a plurality of video transmission parameters for a video;
   deriving, by the video processing device, an optimum value for each of the plurality of video transmission parameters based on a predefined indicator of an acceptable quality of the video using a meta-heuristic harmony search algorithm, wherein the predefined indicator of the acceptable quality of the video comprises a predefined mean opinion score (MOS) and deriving the optimum value for each of the plurality of video transmission parameters further comprises:
   acquiring a plurality of MOS coefficients for the video;
   determining a MOS of the video based on the plurality of MOS coefficients and the plurality of video transmission parameters;
   determining a fitness function based on the MOS of the video and the predefined MOS;
   deriving the optimum value for each of the plurality of video transmission parameters based on the fitness function; and
   dynamically optimizing, by the video processing device, a quality of the video based on the optimum value for each of the plurality of video transmission parameters.

2. The method of claim 1, wherein at least one of:
   acquiring the plurality of video transmission parameters comprises acquiring at least one of a frame rate (FR), a sender bit rate (SBR), or a packet error rate (PER) for the video;
   deriving the optimum value for each of the plurality of video transmission parameters comprises determining one or more of a maximum frame rate, a maximum sender bit rate, or a minimum packet error rate for the predefined indicator of the acceptable quality of the video; and dynamically optimizing the quality of the video further comprises modifying the video based on at least one of an optimum frame rate or an optimum sender bit rate.

3. The method of claim 1, further comprising determining, by the video processing device, one or more of a minimum value, a maximum value, or a plurality of random values between the minimum value and the maximum value for at least one of the plurality of video transmission parameters or the predefined MOS.

4. The method of claim 3, further comprising: generating, by the video processing device, a harmonic memory matrix comprising at least one of:

the minimum, the plurality of random, or the maximum values for each of the plurality of video transmission parameters;

the minimum, the plurality of random, or the maximum value for the predefined MOS, or a plurality of values for the fitness function determined based on at least one of the minimum, the plurality of random, or the maximum values for at least one of the plurality of video transmission parameters or the predefined MOS; and sorting, by the video processing device, the harmonic memory matrix based on the fitness function, wherein the optimum value for each of the plurality of video transmission parameters corresponds to the fitness function having the minimum value.

5. The method of claim 4, further comprising:

adjusting, by the video processing device, the harmonic memory matrix by at least one of a harmony memory consideration rate (HMCR) or a pitch adjustment rate (PAR);

identifying, by the video processing device, a new fitness function from the adjusted harmonic memory matrix;

discarding, by the video processing device, the new fitness function or updating the harmonic memory matrix based on a comparison of the new fitness function with the minimum and the maximum fitness function; and iterating, by the video processing device, the adjusting, the identifying, the discarding, or the updating at a predefined periodic interval for a predefined number of times or until the completion of the video transmission.

6. A video processing device comprising one or more processors and a memory coupled to the one or more processors which are configured to execute one or more programmed instructions comprising and stored in the memory to:

acquire a plurality of video transmission parameters for a video;

derive an optimum value for each of the plurality of video transmission parameters based on a predefined indicator of an acceptable quality of the video using a metaheuristic harmony search algorithm, wherein the predefined indicator of the acceptable quality of the video comprises a predefined mean opinion score (MOS) and the one or more processors are further configured to execute one or more additional programmed instructions comprising and stored in the memory to:

acquire a plurality of MOS coefficients for the video;

determine a MOS of the video based on the plurality of MOS coefficients and the plurality of video transmission parameters;

determine a fitness function based on the MOS of the video and the predefined MOS;

derive the optimum value for each of the plurality of video transmission parameters based on the fitness function; and dynamically optimize a quality of the video based on the optimum value for each of the plurality of video transmission parameters.

7. The video processing device as set forth in claim 6, wherein the one or more processors are further configured to execute one or more additional programmed instructions comprising and stored in the memory to at least one of:

acquire at least one of a frame rate (FR), a sender bit rate (SBR), or a packet error rate (PER) for the video;

determine one or more of a maximum frame rate, a maximum sender bit rate, or a minimum packet error rate for the predefined indicator of the acceptable quality of the video; and modify the video based on at least one of an optimum frame rate or an optimum sender bit rate.

8. The video processing device as claimed in claim 6, wherein the one or more processors are further configured to execute one or more additional programmed instructions comprising and stored in the memory to determine one or more of a minimum value, a maximum value, or a plurality of random values between the minimum value and the maximum value for at least one of the plurality of video transmission parameters or the predefined MOS.

9. The video processing device as claimed in claim 8, wherein the one or more processors are further configured to execute one or more additional programmed instructions comprising and stored in the memory to:

generate a harmonic memory matrix comprising at least one of:

the minimum, the plurality of random, or the maximum values for each of the plurality of video transmission parameters;

the minimum, the plurality of random, or the maximum value for the predefined MOS, or a plurality of values for the fitness function determined based on at least one of the minimum, the plurality of random, or the maximum values for at least one of the plurality of video transmission parameters or the predefined MOS; and sort the harmonic memory matrix based on the fitness function, wherein the optimum value for each of the plurality of video transmission parameters corresponds to the fitness function having the minimum value.

10. The video processing device as claimed in claim 9, wherein the one or more processors are further configured to execute one or more additional programmed instructions comprising and stored in the memory to:

adjust the harmonic memory matrix by at least one of a harmony memory consideration rate (HMCR) or a pitch adjustment rate (PAR);

identify a new fitness function from the adjusted harmonic memory matrix;

discard the new fitness function or updating the harmonic memory matrix based on a comparison of the new fitness function with the minimum and the maximum fitness function; and iterate the adjusting, the identifying, the discarding, or the updating at a predefined periodic interval for a predefined number of times or until the completion of the video transmission.

11. A non-transitory computer readable medium comprising instructions stored thereon for dynamically optimizing quality of videos transmitted over communication networks, which when executed by one or more processors, cause the one or more processors to perform steps comprising:

acquiring a plurality of video transmission parameters for a video;

deriving an optimum value for each of the plurality of video transmission parameters based on a predefined indicator of an acceptable quality of the video using a metaheuristic harmony search algorithm, wherein the predefined indicator of the acceptable quality of the video comprises a predefined mean opinion score (MOS), and deriving the optimum value for each of the plurality of video transmission parameters further comprises:

acquiring a plurality of MOS coefficients for the video;

determining a MOS of the video based on the plurality of MOS coefficients and the plurality of video transmission parameters;

determining a fitness function based on the MOS of the video and the predefined MOS;

deriving the optimum value for each of the plurality of video transmission parameters based on the fitness function; and dynamically optimizing a quality of the video based on the optimum value for each of the plurality of video transmission parameters.

12. The non-transitory computer readable medium as claimed in claim 11, further comprising one or more additional programmed instructions, which when executed by the one or more processors, further cause the one or more processors to perform one or more additional steps comprising at least one of:

acquiring at least one of a frame rate (FR), a sender bit rate (SBR), or a packet error rate (PER) for the video;

determining one or more of a maximum frame rate, a maximum sender bit rate, or a minimum packet error rate for the predefined indicator of the acceptable quality of the video; and modifying the video based on at least one of an optimum frame rate or an optimum sender bit rate.

13. The non-transitory computer readable medium as claimed in claim 11, further comprising one or more additional programmed instructions, which when executed by the one or more processors, further cause the one or more processors to perform one or more additional steps comprising determining one or more of a minimum value, a maximum value, or a plurality of random values between the minimum value and the maximum value for at least one of the plurality of video transmission parameters or the predefined MOS.

14. The non-transitory computer readable medium as claimed in claim 13, further comprising one or more additional programmed instructions, which when executed by the one or more processors, further cause the one or more processors to perform one or more additional steps comprising:

generating a harmonic memory matrix comprising at least one of:

the minimum, the plurality of random, or the maximum values for each of the plurality of video transmission parameters;

the minimum, the plurality of random, or the maximum value for the predefined MOS, or a plurality of values for the fitness function determined based on at least one of the minimum, the plurality of random, or the maximum values for at least one of the plurality of video transmission parameters or the predefined MOS; and sorting the harmonic memory matrix based on the fitness function, wherein the optimum value for each of the plurality of video transmission parameters corresponds to the fitness function having the minimum value.

15. The non-transitory computer readable medium as claimed in claim 14, further comprising one or more additional programmed instructions, which when executed by the one or more processors, further cause the one or more processors to perform one or more additional steps comprising:

adjusting the harmonic memory matrix by at least one of a harmony memory consideration rate (HMCR) or a pitch adjustment rate (PAR);

identifying a new fitness function from the adjusted harmonic memory matrix;

discarding the new fitness function or updating the harmonic memory matrix based on a comparison of the new fitness function with the minimum and the maximum fitness function; and iterating the adjusting, the identifying, the discarding, or the updating at a predefined periodic interval for a predefined number of times or until the completion of the video transmission.

\* \* \* \* \*